United States Patent
Bodkins

[15] 3,695,743
[45] Oct. 3, 1972

[54] OPTICAL REFLECTOR
[72] Inventor: Arthur I. Bodkins, Winthrop, Mass.
[73] Assignee: M. James Zelman, Boston, Mass.; trustee
[22] Filed: March 16, 1970
[21] Appl. No.: 19,763

[52] U.S. Cl. ...................................350/1, 350/166
[51] Int. Cl. ......................G02b 13/14, G02b 5/28
[58] Field of Search......................350/1, 166, 296

[56] References Cited
UNITED STATES PATENTS

2,700,323  1/1955  Schroder......................350/1
3,514,174  5/1970  Gans et al......................350/1
3,325,666  6/1967  Bird et al. ................350/1 UX

*Primary Examiner*—David Schonberg
*Assistant Examiner*—John W. Leonard
*Attorney*—Wolf, Greenfield, Hieken and Sacks

[57] ABSTRACT

An optical reflector is disclosed having a glass base substrate which may be in a spherical form. The substrate has six thin alternate high and low index of refraction dielectric layers vacuum deposited on it. The high index material is first deposited directly on the substrate and the finally deposited is of a low index of refraction material.

1 Claim, 2 Drawing Figures

PATENTED OCT 3 1972

3,695,743

INVENTOR
Arthur J. Bodkins
BY
Wolf, Greenfield Hieken + Sacks 3,695,743

OPTICAL REFLECTOR

SUBJECT MATTER AND BACKGROUND OF THE INVENTION

The present invention pertains in general to optical reflectors and is concerned in particular with highly efficient reflectors that are capable of reflecting a large percentage of the available visible energy from an illuminating light source.

Luminaires for theatre and television applications have traditionally used color filters separate from the light source to provide the desired color output from the source. With the advent of color television the use of high light levels has become necessary in television broadcasting studios. This has made the lighting problems more critical. Excess heat has caused more frequent replacement of these color filters and the overall cost of adequate studio lighting has increased significantly. It is therefore important to reduce the overall operating temperature of the luminaires and to increase the efficiency of optical reflectors to thereby minimize the reflection of non-visible heat energy.

One way of providing higher reflectivities is by using an optical reflector that has a multi-layer film vacuum deposited on a glass substrate or the like. These reflectors are adequate fro some purposes. However, they are not capable of efficiently reflecting a relatively high percentage of the energy from the visible portion of the spectrum, particularly in the blue region. Further these reflectors, are not capable of also transmitting a relatively high percentage of heat energy through the reflector.

SUMMARY OF THE INVENTION

It is an object of the present invention therefore, to provide an optical reflector for use with an illuminating source whereby the reflector is capable of reflecting a large percentage of the energy in the visible region.

It is a further object of the present invention to provide an optical reflector that includes a base substrate material having a plurality of dielectric layers deposited thereon, thereby enhancing its reflective qualities.

It is another object of the present invention to provide an optical reflector that includes a base substrate and dielectric layers of alternately deposited materials having respective high and low indices of refraction. Generally speaking low index materials have an index of refraction less than 2.0, while high index materials have an index of refraction greater than 2.0.

It is still another object of the present invention to provide an optical reflector that transmits a relatively large portion of the heat energy through the reflector and reflects a comparatively small portion.

It is another object of the present invention to provide an optical reflector and associated source that is capable of operating at lower overall temperatures.

It is still a further object of the invention to provide an optical reflector that may be constructed relatively easily and at low cost.

According to the invention, an optical reflector includes a base material having a plurality of dielectric layers of alternate high and low index of refraction material deposited thereon. The reflector may be formed in any one of a variety of different configurations, such as in a spherical or parabolic shape. In one embodiment the base substrate is a glass material. The relatively thin layers of dielectric material may be sequentially deposited by a conventional vacuum deposition technique with a high index of refraction material being deposited directly on the substrate. The final layer deposited may be of a low index of refraction material and in one embodiment has a relative thickness that is slightly larger than the preceeding layers of low index of refraction material.

Numerous other objects and advantages of the invention will now become apparent upon a reading of the following specifications in conjunction with the drawings.

BRIEF DESCRIPTION OF,

DETAILED DESCRIPTION

Figure 1:
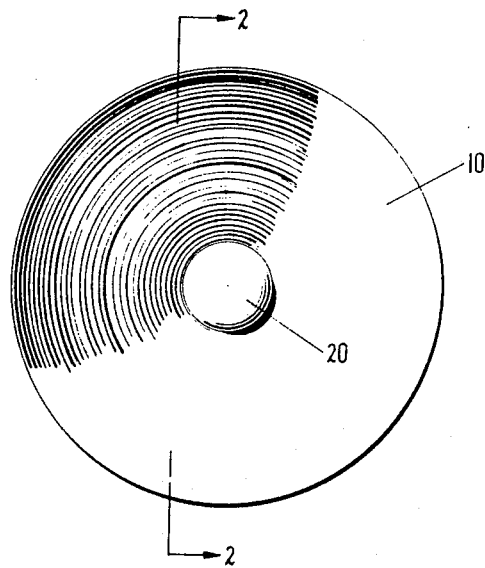
FIG. 1 shows an optical reflector in accordance with the present invention.

FIG. 1 shows reflector 10, constructed in accordance with the principles of the present invention. A light source 20 is ordinarily located at the focal point of the reflector and may be a tungsten or quartz-halogen light source. Such a light source usually emits energy in the temperature range between 2,700° K and 3,400°K. With the reflector of the invention, the temperature range of the reflected light may be from 4,000°K to 6,000°K. The energy light source 20 includes energy from the visible part of the spectrum and also that from the infra-red and other portion of the frequency spectrum.

Figure 2:
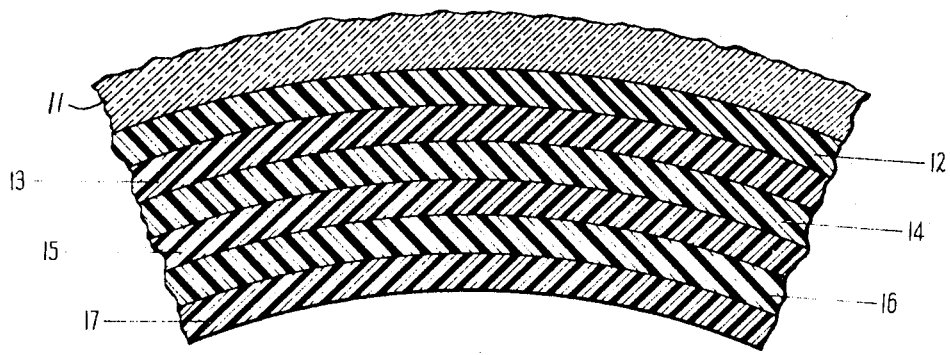
FIG. 2 is a cross-sectional view taken along the line of 2—2 of FIG. 1 showing the deposited layers somewhat on an enlarged non-uniform scale.

Referring to FIG. 2 there is shown a cross-section of a part of the reflector of FIG. 1. The substrate for this particular embodiment is a glass material that is in the form of a circular reflector. Deposited on glass substrate 11 are a series of six separately deposited layers 12, 13, 14, 15, 16 and 17 starting with layer 12. The layers 12, 14, and 16 are a material having a relatively high index of refraction. In one embodiment such material was zinc sulfide, which has an index of refraction of 2.4. The layers 13, 15 and 17 are of a relatively low index of refraction material. In one embodiment, such material was magnesium fluoride which has an index of refraction of 1.38.

It is conventionally known that when each layer is optically one-quarter wavelength in relation to the midpoint of the visible region, in thickness, reflective reinforcement takes place. In the present invention it has been found that by making the thickness of each layer one-quarter wavelength of the visible spectrum, times its index of refraction, that better reflective quality is obtained in the visible region. In the embodiment of FIG. 2 the layers 12, 14 and 16 are each 1,100 angstrom units times the index of refraction of the material that was used. With the use of zinc sulfide having an index of refraction of 2.4 the thickness of layers 12, 14 and 16 is each 2,640 angstroms.

Layers 13 and 15 are composed of low index of refraction materials such as magnesium floride. Each of these layers had a thickness also of 1.100 angstroms times the index of refraction which is 1.38 for magnesium floride. The thickness of these two layers is therefore, approximately 1,490 angstroms. The finally deposited layer 17 also of a low index of refraction material such as magnesium floride has a thickness equal to 1,500 angstroms times its index of refraction or in other words a thickness of approximately 2,070 angstroms.

The particular configuration shown in FIG. 2 may be deposited by a high vacuum technique. A conventional vacuum technique, with a vacuum of $10^{-5}$ Tors and a tungsten-fixed filiment may be used to sequentially deposit the desired materials upon the base substrate. Conventional optical detection means may be provided to detect when the optical thickness of the layer is at its desired thickness. With the reflector of FIG. 2 constructed according to the principles of the present invention a reflectivity of up to 95 percent was experienced in the visible portion of the spectrum, particularly in the blue region. With a configuration like that shown in FIG. 2, the transmission of heat energy through the reflector was about 50 percent. Therefore, a portion of the heat producing energy was transmitted through the reflector and not into the usuable, visible light beam. Means may also be provided surrounding the reflector adjacent layer 11 for passing liquid therethrough, or the like, in order to cause a cooling of the reflector in that area.

One feature of the present invention is that the reflector can be used at higher temperatures than those heretofore possible because of the relatively large amount of heat that is transmitted through the reflector rather than reflected into the visible light beam. Another feature of the present invention is that for certain applications a cooler filter on the luminaire is not necessary. With the use of the reflector according to the invention, it is possible to operate the light source at elevated temperatures so that the reflector itself reflects energy in the visible range between red and violet.

The particular configuration disclosed herein using a six layer configuration appears to provide the most optinum results. It is not fully understood why the particular six-layer arrangement produces these results. However, it is believed to be related to the fact that the particular layers are tailored to a thickness that is a function of the index of refraction of each layer.

Having now described the invention, certain modifications of and departures from the invention should now become apparent to the ordinary mechanic skilled in the art all of which are contemplated as falling withing the spirit and scope of the present invention, and to be limited solely by the appended claims.

What is claimed is:

1. A curved optical reflector for use with an illuminating light source comprising;

a glass base substrate, a plurality of alternate high and low index of refraction layers of dielectric material, said plurality of layers being deposited with a first of said layers being deposited directly on said base substrate, said first, third and fifth layers comprising zinc sulfide and having a thickness on the order of 2,600 angstroms, said second and fourth layers comprising magnesium fluoride and having a thickness on the order of 1,500 angstroms, said sixth layer comprising magnesium fluoride and having a thickness on the order of 2,100 angstroms.

* * * * *